United States Patent
Luppi et al.

(10) Patent No.: US 10,883,342 B2
(45) Date of Patent: Jan. 5, 2021

(54) SUBMARINE CONNECTION ASSEMBLY

(71) Applicant: TECHNIP FRANCE, Courbevoie (FR)

(72) Inventors: Ange Luppi, Nimes (FR); Alexandra Kollar, Poulx (FR)

(73) Assignee: TECHNIP FRANCE

( * ) Notice: Subject to any disclaimer, the term of this patent is extended or adjusted under 35 U.S.C. 154(b) by 1098 days.

(21) Appl. No.: 15/309,124

(22) PCT Filed: May 4, 2015

(86) PCT No.: PCT/FR2015/051181
§ 371 (c)(1),
(2) Date: Nov. 4, 2016

(87) PCT Pub. No.: WO2015/170044
PCT Pub. Date: Nov. 12, 2015

(65) Prior Publication Data
US 2017/0081947 A1    Mar. 23, 2017

(30) Foreign Application Priority Data

May 7, 2014 (FR) ..................................... 14 54130

(51) Int. Cl.
| | |
|---|---|
| E21B 43/01 | (2006.01) |
| E21B 17/01 | (2006.01) |
| E21B 17/04 | (2006.01) |
| F16L 1/26 | (2006.01) |

(52) U.S. Cl.
CPC ........ *E21B 43/0107* (2013.01); *E21B 17/015* (2013.01); *E21B 17/04* (2013.01); *F16L 1/26* (2013.01)

(58) Field of Classification Search
CPC ......... F16L 1/26; E21B 43/0107; E21B 17/04

USPC .................................................... 285/24, 920
See application file for complete search history.

(56) References Cited

U.S. PATENT DOCUMENTS 3,724,061 A    4/1973  Schipper
2011/0056701 A1  3/2011  Jones et al.

FOREIGN PATENT DOCUMENTS

GB          2 453 168       4/2009
WO    WO 2009/139639 A1    11/2009

OTHER PUBLICATIONS

International Search Report dated Sep. 21, 2015 issued in corresponding International patent application No. PCT/FR2015/051181.
Written Opinion dated Sep. 21, 2015 issued in corresponding International patent application No. PCT/FR2015/051181.

*Primary Examiner* — Matthew Troutman
*Assistant Examiner* — Fannie C Kee
(74) *Attorney, Agent, or Firm* — Ostrolenk Faber LLP

(57) ABSTRACT

A submarine connection for interconnecting a riser pipe and a flexible pipe (26). The riser pipe has an upper end and the flexible pipe (26) has a lower end (30). A connection assembly includes a rigid fitting having a first limb (64) to be connected to the lower end (30) and a second limb (66) with a connector (67) on the end, and a body (36) having a head (42) and an opposing base (46) provided with an end piece (52) to be mounted on the upper end. The connection assembly also includes first guiding elements (60, 86) secured to the body (36), extending in a position at a distance from the axis of the end piece (52), and second guiding elements (76, 81) secured to the first limb (64), suitable for cooperating with the first guiding elements (60, 86).

10 Claims, 4 Drawing Sheets

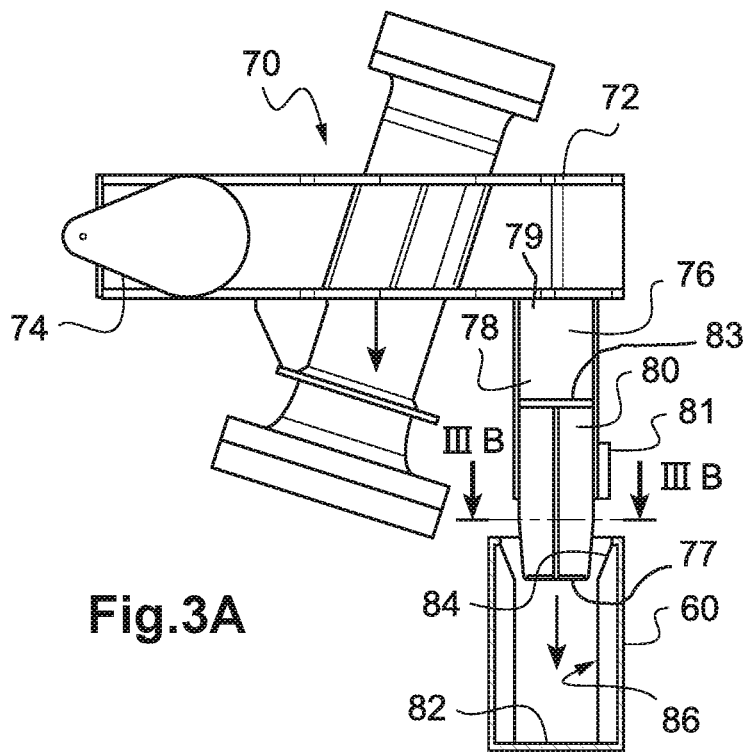
Fig.3A
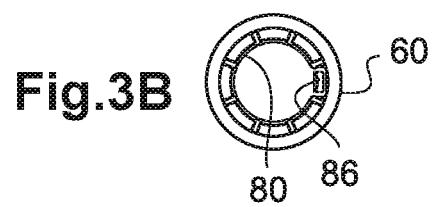
Fig.3B
Fig.4
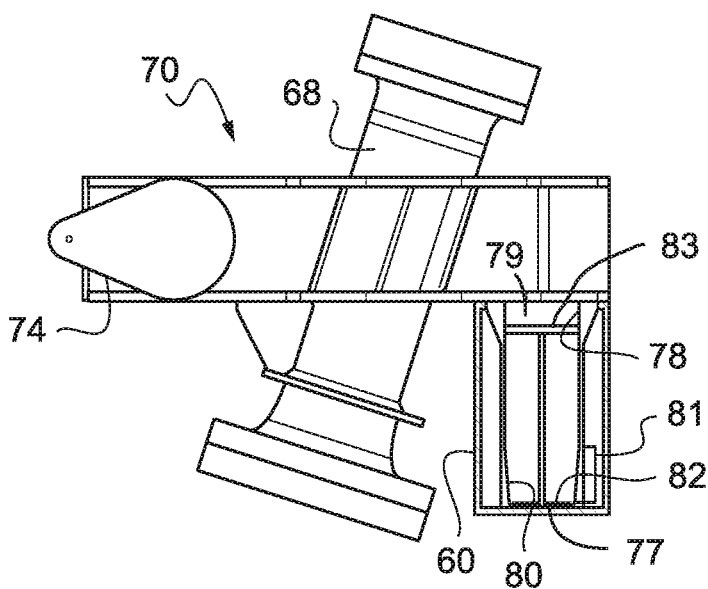

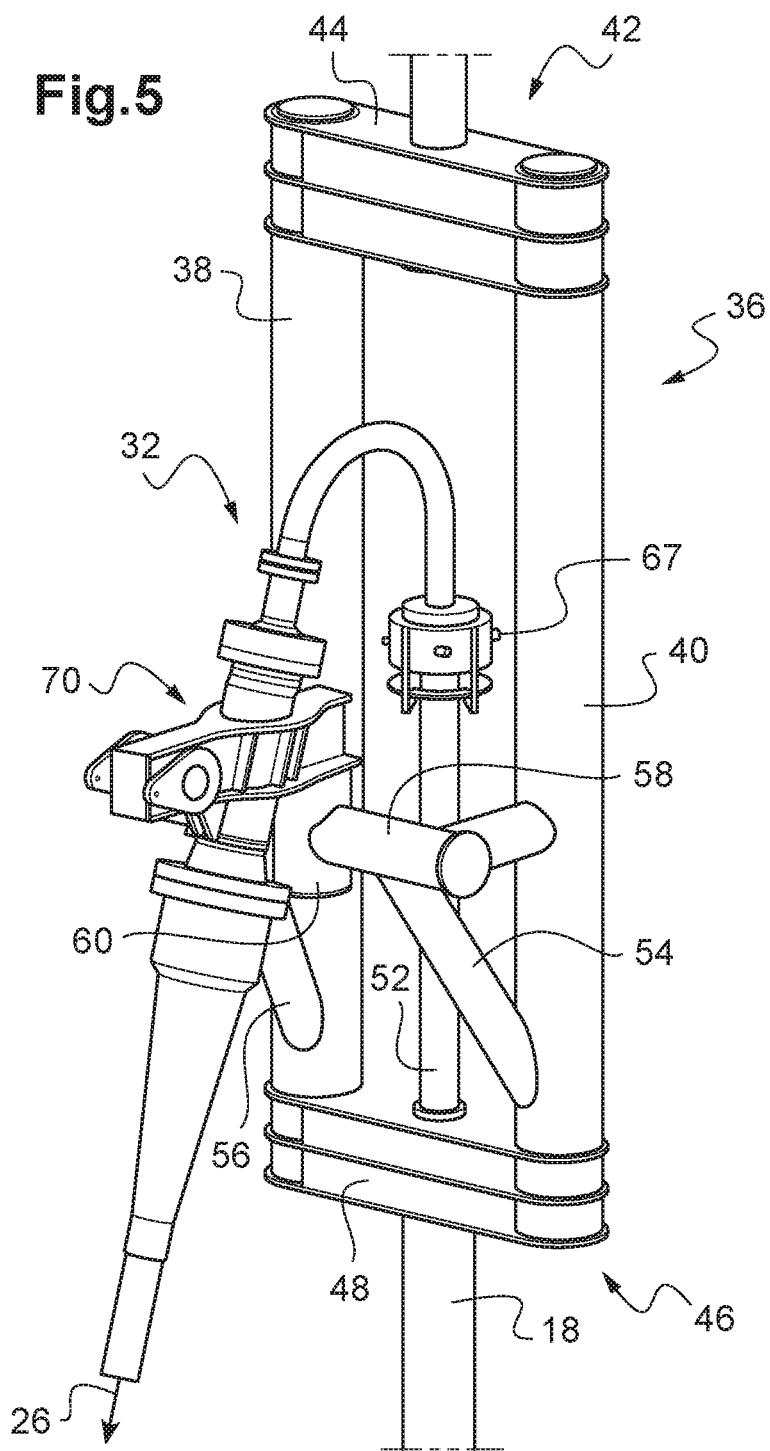

SUBMARINE CONNECTION ASSEMBLY

CROSS-REFERENCE TO RELATED APPLICATIONS

The present application is a 35 U.S.C. §§ 371 national phase conversion of PCT/FR2015/051181, filed May 4, 2015, which claims priority of French Patent Application No. 1454130, filed May 7, 2014, the contents of which are incorporated by reference herein. The PCT International Application was published in the French language.

TECHNICAL FIELD

The present invention relates to an underwater (submarine) connection assembly allowing a riser and a flexible pipe to be connected together.

One envisaged field of application is notably that of oil exploitation at great depth, where it is necessary to convey the hydrocarbons between a seabed and a surface.

TECHNICAL BACKGROUND

Known underwater connection assemblies allow for this transport of hydrocarbons. They comprise a riser, generally rigid, which extends from the seabed as far as an intermediate zone vertically aligned with the seabed and situated some distance below the surface, and a flexible pipe connected in the continuation of the riser and which extends in a catenary curve from the intermediate zone up to the surface where it is connected to a surface facility. The riser is kept substantially vertical by a float immersed in the intermediate zone. This type of connection assembly allows hydrocarbons to be raised from the bottom of the sea up to the surface while at the same time getting round surface disturbances associated with the swell, with currents, or even with the winds.

In order to make the connection between the riser and the flexible pipe in situ, the connection assemblies comprise a longitudinal frame having, on the one hand, a bottom to which an upper end of the riser is attached and, on the other hand, a top connected to the float. The bottom is secured to an end piece which is itself mounted on the upper end of the riser. The assemblies also comprise a rigid U-shaped coupling having a first limb able to be connected to a lower end of the flexible pipe and an opposite, second, limb ending in a connector.

Also, the connection assemblies comprise a guide device so as to be able to guide the rigid U-shaped coupling from which the flexible pipe is suspended with respect to the frame and finally, to join together the connector and the end piece. Reference may be made to document GB 2 453 168 which discloses the use of a tie mounted on the rigid support and ending in a ring, which ring is secured to a sling controlled from the surface, the frame being equipped with a catching stud situated in the prolongation of the connection. That way, using the sling, the ring can be placed in the catching stud, so as to be able to guide and control the coming-together of the connector and of the coupling.

However, difficulties arise with connecting the connector to the end piece as the depths of water become greater. This is because the risers are longer and therefore heavier. The same is true of the flexible pipes and therefore the load that needs to be applied to the connector is greater. Now, these connectors are delicate and expensive and, given the masses involved, the slightest knock may have a negative impact on the integrity of the connector. To this end, as the rigid U-shaped coupling approaches the connector which equips it, the latter is driven in motion through the frame and there are risks of damage through contact. What is more, when the connection of the connector and of the end piece is performed, the shock between the two of them may damage the connector.

SUMMARY OF THE INVENTION

A problem that therefore arises and that the present invention seeks to address is that of providing an underwater connection assembly that allows the connector to be kept better intact when it is being connected.

To this end, the present invention proposes an underwater connection assembly for connecting together, between a seabed and a sea surface, a riser extending from said seabed and a flexible pipe leading to said sea surface, said riser having an upper end, while said flexible pipe has a lower end, said connection assembly comprising, on the one hand, a rigid U-shaped coupling having a first limb that can be connected to said lower end and an opposite second limb ending in a connector and, on the other hand, a frame having a top intended to be connected to a float and an opposite bottom equipped with an end piece having an axis oriented toward said top and intended to be mounted on said upper end, said connection assembly further comprising a guide device allowing said connector to be guided in movement toward said end piece so that said connector and said end piece can be coupled together. Said guide device comprises first guide members secured to said frame and second guide members secured to said rigid U-shaped coupling which are able to collaborate with said first guide members, and said guide members furthermore comprise a damper so as to be able to damp the movement of said connector toward said end piece.

Thus, one feature of the invention lies in the use of a damper on the guide members, so that the rigid coupling can be slowed with respect to the frame at the end of its travel and, as a result, the impact of the connector with the end piece when connection occurs can be attenuated.

Advantageously, said first guide members extend in a position away from said axis of said end piece, where said second guide members are secured to said first limb. In that way, the risk of collision between the connector of the rigid coupling and these first guide members is considerably attenuated. In that way, it becomes easier for the connector and the end piece to move closer together when translationally driven towards one another.

According to one particularly advantageous embodiment of the invention, the connection assembly comprises a guide beam mounted transversely on said first limb in the direction of said second limb, and said second guide members are installed on said guide beam. Also, the first limb, the guide beam and the second guide members form a rigid assembly. What is more, said guide beam preferably has an extension extending away from said second limb so that said rigid coupling can be suspended. The first limb passes through the center of the guide beam to which it is secured, substantially in its middle part and substantially at an angle. As a result, the flexible pipe may be suspended from a sling via the extension, while the guide beam remains substantially horizontal and while the second limb of the rigid U-shaped coupling extends substantially vertically. The distribution of forces that allow such holding will be explained in greater detail later on in the description.

According to one particularly advantageous invention implementation feature, said second guide members comprise a telescopic sleeve oriented substantially parallel to said second limb to form said damper.

For preference, the free sleeve extends substantially perpendicular to the guide beam in an opposite direction to the aforementioned suspension sling.

According to one particularly advantageous alternative form of embodiment of the invention, said telescopic sleeve has a first element forming a cylindrical chamber, and a second element forming a piston allowing a gas to be trapped inside said cylindrical chamber. In that way, with the second element forming a piston which extends as a projection from the first element in the continuation thereof, said second element is able to compress the gas trapped inside the cylindrical chamber. The gas is elastically compressible and in that respect forms a damper. As will be explained later in more detail, in the remainder of the description, according to one particular embodiment the invention provides for the use of a valve allowing gas to escape so as to allow the piston to enter the first element fully.

Furthermore, said first guide members preferably comprise a tubular receptacle oriented substantially parallel to said axis of said end piece. The tubular receptacle has a cross section similar to that of the free sleeve so that the one can collaborate with the other. Thus, since the tubular receptacle is parallel to the axis of the end piece and the free sleeve is itself parallel to the second limb, insofar as their respective axis center-distances are respectively the same, when the sleeve is engaged in the receptacle, the connector situated at the end of the second limb can be driven naturally in a translational movement toward the end piece. Thus, the connector and the end piece are not only driven toward one another but furthermore driven coaxially.

In addition, for preference, said receptacle has a bottom able to have bearing against it the second element of the telescopic sleeve when this has engaged inside the receptacle. As a result, the gas trapped inside the chamber becomes compressed as the coupling continues its travel with respect to the frame, as will be explained hereinafter.

According to another particularly advantageous implementation feature, said sleeve and said tubular receptacle have indexing members so as to be able to guide the first and second guide members in rotation relative to one another. And so the indexing members are adjusted in such a way that the second limb and the end piece are oriented coaxially when the free sleeve is engaged in the tubular receptacle. In that way, the connector is driven in translation and coaxially toward the end piece with a view to connection.

According to one preferred embodiment, said sleeve has a radially projecting indexing piece, whereas said tubular receptacle has an axial slot to form said indexing members. What is more, the tubular receptacle has a chamfered inlet opening. In that way, when the free sleeve is brought closer to the tubular receptacle, it is easier for it to engage therein.

For preference, said frame comprises two uprights that are substantially parallel and two supports that are secured respectively to said uprights, said second guide members being mounted on said supports. The two supports form a support bracket which projects from the parallel uprights of the frame. The second guide members are thus mounted at the end of the bracket as will be explained in greater detail in the rest of the description.

Other specifics and advantages of the invention will become apparent from reading the description given hereinafter of one particular embodiment of the invention, given by way of nonlimiting indication, with reference to the attached drawings in which:

FIG. 3A is a schematic detailed view of the connection assembly depicted in, FIG. 2 in a second phase of implementation;

FIG. 3B is a schematic plan view in section on IIIB-IIIB illustrated in FIG. 3A;

FIG. 4 is a schematic detailed view of the connection assembly depicted in FIG. 2, in a third phase of implementation; and FIG. 5 is a schematic perspective view of the connection assembly illustrated in FIG. 2 in the said third phase of implementation.

DESCRIPTION OF AN EMBODIMENT

Figure 1:
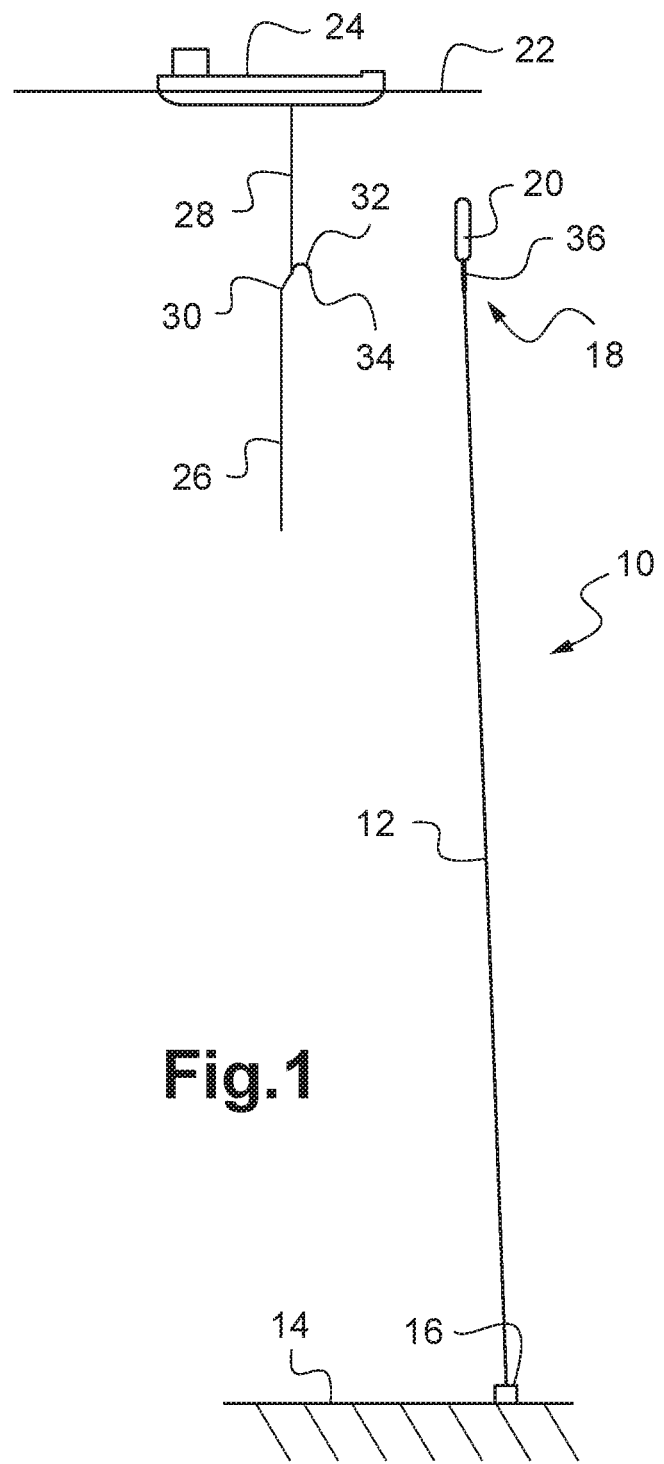
FIG. 1 is a schematic view of the implementation of an underwater connection assembly according to the invention.

FIG. 1 schematically depicts a tower 10 comprising a rigid riser 12 fixed to a seabed 14 by means of an anchoring system 16. Furthermore, the rigid pipe 12 has an upper part 18 suspended from a float 20 in which there is trapped a sufficient quantity of air to keep the rigid pipe in a vertical position. The float 20 is situated in a zone comprised between the seabed 14 and a surface 22, more specifically near the surface 22. This zone is nevertheless chosen to be some distance away from the surface 22, for example 30 m away, approximately, so as to be less dependent on surface movements.

FIG. 1 also illustrates a pipe-laying vessel 24 sailing on the surface 22 vertically above the tower 10. A flexible pipe 26 is suspended from the pipe-laying vessel 24 via a cable 28. The flexible pipe 26 has a lower end 30 extended by a rigid U-shaped coupling 32 which ends in a connector 34. These elements secured to the flexible pipe 26 will be described in greater detail hereinafter. This flexible pipe is borne by the pipe-laying vessel 24 in the vicinity of the upper part 18 of the rigid pipe 12 so as to be connected thereto as will be explained later. To do that, the upper part 18 of the rigid pipe 12 comprises a longitudinal frame 36 that will be described first of all in three-quarter view and with reference to FIG. 5.

FIG. 5 again shows the frame 36. It has two parallel cylindrical main uprights 38, 40 of a length of, for example, between 10 and 15 m. The main uprights 38, 40 are joined together in an upper end 42 of the frame 36 forming the top, by an upper crossmember 44 connected to the float 20, not depicted here, and in a lower end 46 forming the bottom, by a lower crossmember 48. FIG. 5 again shows the upper part 18 of the rigid riser which ends in a connection upper end 52 forming an end piece, and is held in engagement through the lower crossmember 48 between the main uprights 38, 40, substantially equidistant therefrom.

Furthermore, the frame 36 is equipped with two parallel supports 56, 54 respectively secured to the said uprights. The two supports 56, 54 being connected to one another by a supporting crossmember 58 so as to form a bracket. The frame 36 is then equipped with first guide members 60 installed on the supporting crossmember 58, separated from the connection upper end 52 and that will be described in greater detail in FIG. 2.

Figure 2:
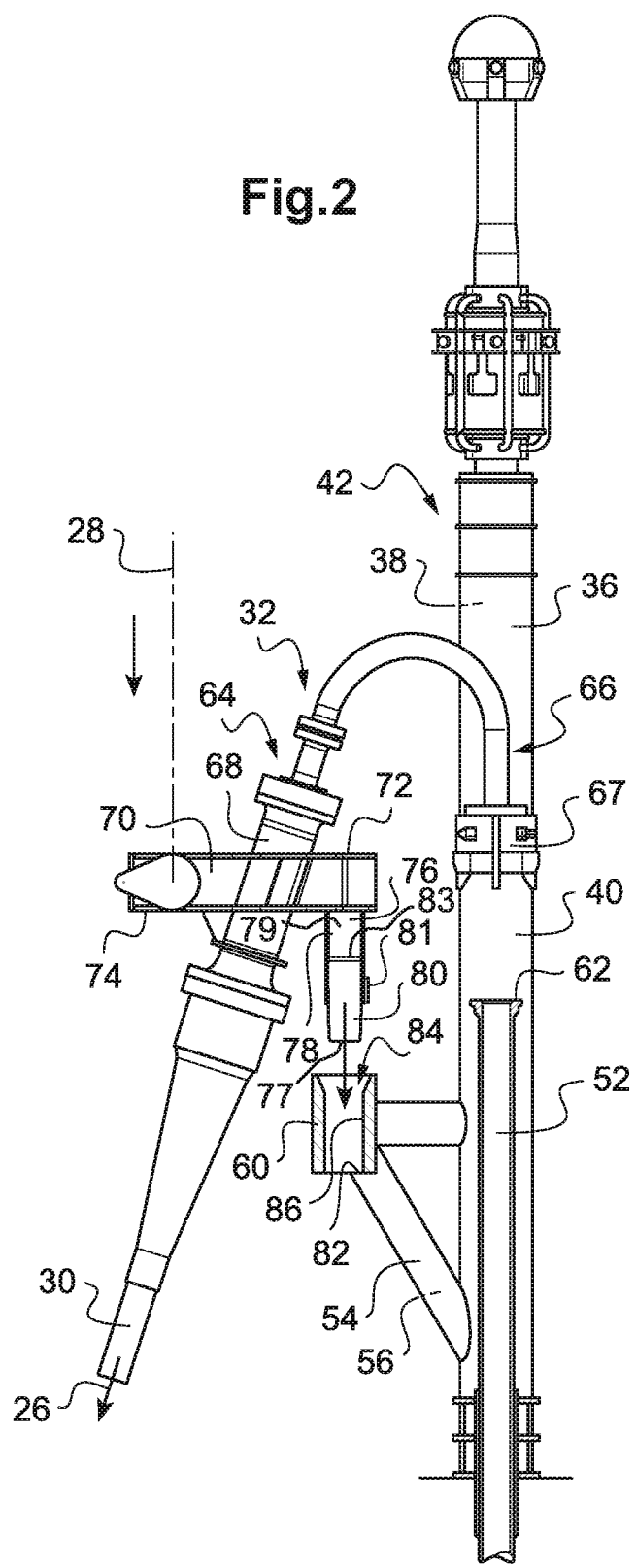
FIG. 2 is a schematic side view of the connection assembly according to the invention in a first phase of implementation.

FIG. 2 illustrates the situation in which, by action of the pipe-laying vessel 24 depicted in FIG. 1, the flexible pipe 26 equipped with its rigid U shaped coupling 32 has been brought level with the frame 36. All the elements present will be described in detail first of all before tackling how they interact.

FIG. 2 thus again shows the frame 36 in side view and the connection upper end 52 which ends in a male tailpiece 62. The tailpiece and the connection upper end 52 are coaxial and their common axis extends towards the upper end 42 of the frame 36. Also visible are the supports 54, 56 and the first guide members 60 formed of a tubular receptacle oriented substantially parallel to and some distance away from the connection upper end 52. It will also be seen that the tubular receptacle 60 is in a position spaced away from the parallel cylindrical uprights 38, 40.

FIG. 2 once again also shows the lower end 30 of the flexible pipe 26, equipped with the rigid U-shaped coupling 32. The latter has a first limb 64 and an opposite second limb 66. The latter ends in a connector 67. The two limbs 64, 66 are inclined relative to one another for example by an angle of between 30° and 20°. The first limb 64 has a reinforced portion 68 directly connected to the lower end 30. This reinforced portion 68 passes through a guide beam 70 to which it is secured. The reinforced portion 68 is kept inclined with respect to the guide beam 70 by an angle of close to 90° minus the angle of inclination of the two limbs 64, 66 relative to one another.

The guide beam 70 has an internal part 72 oriented towards the second limb 66 and the connector 67 and away from the reinforced portion 68, an extension 74 forming an external part, at the end of which the cable 28 is tethered.

In addition, the internal part 72 is equipped with a telescopic sleeve 76 forming the second guide members. The telescopic sleeve 76 extends substantially perpendicular to the guide beam 70 and in a direction substantially parallel to the second limb 66. It will be seen that the telescopic sleeve 76 extends in an opposite direction to the curved inside of the rigid coupling 32. Furthermore, the telescopic sleeve 76 is circular in cross section and has a first element 78 secured to the guide beam 70 and forming a cylindrical chamber 79. It also has a second element 80 forming a piston mounted with the ability to move translationally inside the first element 78. Also, the second element 80 has a free end 77 which extends as a projection from the first element 78 and, on the opposite side, a reinforced end 83 equipped with a seal intended to seal the cylindrical chamber 79 closed. The second element 80 forming the piston allows a gas to be trapped fluid-tightly inside the cylindrical chamber. The gas, for example nitrogen, is elastically compressible and will therefore be able to act as a damper as will be explained hereinafter.

In addition, the first element 78 of the sleeve 76 is provided with an indexing piece 81.

The tubular receptacle 60 has an end wall 82 and an opposite chamfered or frustoconical opening 84. Furthermore, it has a diameter identical to the diameter of the sleeve 76, to within a functional clearance. A longitudinal slot 86 is formed axially in the wall of the tubular receptacle 60 so as to be able to accept the indexing piece 81.

FIG. 3A shows again in detail the telescopic sleeve 76 secured to the internal part 72 of the guide beam 70 and, more specifically shows the first element 78 of the sleeve 76, forming a cylindrical chamber 79, in which the second element 80 that forms a piston is slidingly engaged. It also again shows the tubular receptacle 60 with its chamfered opening 84, inside which the free end 77 of the second element 80 of the sleeve 76 is partially engaged. FIG. 3B again shows, viewed from above, the tubular receptacle 60 with its longitudinal slot 86 and the second element 80 of the sleeve 76.

In FIG. 2, it may be seen that the center-distance between the sleeve 76 and the second limb 66, namely the distance between their axes, in a perpendicular direction, is equal to the center-distance between the connection upper end 52 and the tubular receptacle 60.

Furthermore, the indexing piece 81 and the slot 86 (FIG. 3B) are respectively engineered so that when they are engaged one inside the other, the second limb 66 equipped with the connector 67 and the connection upper end 52 are coaxial.

Thus, in FIG. 2, the cable 28 has been guided so as to be able to bring the rigid U shaped coupling 32 closer to the frame 36 and so as to bring the second limb 66 between the uprights 38, 40, while the sleeve 76 is brought to face the chamfered opening 84 of the tubular receptacle 60.

It will also be seen that the guide beam 70 suspended from the cable 28 by the extension 74 thereof runs substantially horizontally thanks to the weight of the flexible pipe 26. Hence, the connection upper end 52 and the frame 36 are kept vertical thanks to the tension applied by the float 20, which is held by the pipe 12.

From the situation as depicted in FIG. 2, the cable 28 is relaxed further, so that the second element 80 of the sleeve 76 approaches the chamfered opening 84 of the tubular receptacle 60. The chamfered opening 84 thus forms a ramp for the second element 80 so as to guide it toward the center of the tubular receptacle 60. Thus, as the sleeve 76 descends, thanks to the chamfered opening 84, despite the lateral movements of the sleeve 76 which are caused mainly by the movements of the pipe-laying vessel 24 it nevertheless enters the tubular receptacle 60.

Furthermore, as illustrated by FIG. 3A, the angular orientation of the sleeve 76 is controlled by the engagement of the indexing piece 81 in the slot 86. Hence, when the cable 28 is relaxed further still, the sleeve 76 fits into the tubular receptacle 60 and, more specifically, the free end 77 of the second element 80 comes to bear against the end wall 82, and under the weight of the guide beam 70 supporting the flexible pipe 26, the second element 80 has a tendency to enter the first element 78, at the same time compressing the gas situated inside the cylindrical chamber 79. In that way, the movement of the rigid coupling 32 toward the frame 36 is slowed and braked, so that the connector 67 approaches the tailpiece 62 at a speed that allows the connection to be made without a jolt.

FIG. 4 illustrates just such a situation. In this way, the first element 78 is wedged radially between the second element 80 and the internal wall of the tubular receptacle 60. Thus, the sleeve 76 is locked inside the tubular receptacle 60.

Thanks to the indexing and, more specifically, to the use of the indexing piece 81 inside the slot 86, the connector 67 has, in parallel, come to fit over the male tailpiece 62 of the connection upper end 52 in order to lock automatically thereto.

FIG. 5 again shows the connector 67 connected to the connection upper end 52 on the male tailpiece 62 which it hides in the figure. Thus, the flexible pipe 26 and the riser 12 are connected to one another so that a hydrocarbon can be transported.

The invention claimed is:

1. An underwater connection assembly for connecting, between a seabed and a sea surface, a riser extending from the seabed with a flexible pipe leading to the surface, the connection assembly comprising:

the riser having an upper end, the flexible pipe having a lower end;

a rigid U shaped coupling having a first limb connectable to the lower end and an opposite second limb ending in a connector;

a frame having a top configured to be connected to a float and an opposite bottom;

an end piece on the bottom and having an axis oriented toward the top end for being mounted on the upper end;

a guide device configured to allow the connector to be guided in movement toward the end piece so that the connector and the end piece can be coupled together;

the guide device comprising first guide members secured to frame, and second guide members secured to the U shaped coupling and the second guide members are able to collaborate with the first guide members, and the first and second guide members further comprise a damper configured to damp the movement of the connector toward the end piece.

2. The underwater connection assembly as claimed in claim 1, further comprising, the first guide members extending in a position that is away from an axis of the end piece, while the second guide members are secured to the first limb of the coupling.

3. The underwater connection assembly as claimed in claim 1 further comprising: a guide beam mounted transversely of the first limb of the coupling and extending in a direction of the second limb of the coupling; and the second guide members are installed on the guide beam.

4. The underwater connection assembly as claimed in claim 3, further comprising: an extension of the guide beam extending away from the second limb of the coupling so that the rigid coupling can be suspended.

5. The underwater connection assembly as claimed in claim 1, further comprising:

the second guide members comprising a telescopic sleeve oriented substantially parallel to the second limb to form the damper.

6. The underwater connection assembly as claimed in claim 5, further comprising: the telescopic sleeve having a first element defining a cylindrical chamber, and a second element defining a piston closing the cylindrical chamber and allowing a gas to be trapped inside the cylindrical chamber under the piston.

7. The underwater connection assembly as claimed in claim 1, further comprising: the first guide members comprising a tubular receptacle oriented substantially parallel to an axis of the end piece.

8. The underwater connection assembly as claimed in claim 5, further comprising: the telescopic sleeve and a tubular receptacle having cooperating indexing members configured for guiding the telescopic sleeve and the tubular receptacle in rotation relative to one another.

9. The underwater connection assembly as claimed in claim 8, wherein the indexing members comprise the telescopic sleeve having a radially projecting indexing piece and the tubular receptacle having a cooperating axial slot to together form the indexing members.

10. The underwater connection assembly as claimed in claim 1, further comprising: the frame comprising two uprights that are substantially parallel and spaced apart and two supports that are secured respectively to the uprights, and the first guide members are mounted on the supports.

* * * * *